United States Patent
Nishikawa et al.

(10) Patent No.: US 7,800,265 B2
(45) Date of Patent: Sep. 21, 2010

(54) MOTOR FOR AN ELECTRIC POWER STEERING APPARATUS

(75) Inventors: Hideya Nishikawa, Chiyoda-ku (JP); Yoshihito Asao, Chiyoda-ku (JP); Kengo Fujimoto, Kengo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/036,515

(22) Filed: Feb. 25, 2008

(65) Prior Publication Data

US 2009/0121570 A1 May 14, 2009

(30) Foreign Application Priority Data

Nov. 12, 2007 (JP) ............................. 2007-293144

(51) Int. Cl.
  *H02K 5/16* (2006.01)
(52) U.S. Cl. ....................................................... 310/90
(58) Field of Classification Search .................. 310/90; 384/517, 518
  See application file for complete search history.

(56) References Cited

U.S. PATENT DOCUMENTS

| 3,516,717 | A | * | 6/1970 | Peterson ...................... 384/517 |
| 5,719,454 | A | * | 2/1998 | Halsey et al. ................. 310/90 |
| 7,217,106 | B2 | | 5/2007 | Tanaka et al. |
| 2004/0134708 | A1 | | 7/2004 | Tanaka et al. |
| 2006/0062505 | A1 | * | 3/2006 | Hoefs ......................... 384/517 |

FOREIGN PATENT DOCUMENTS

| EP | 0469651 A1 | 2/1992 |
| JP | 59-95766 | 6/1984 |
| JP | 61-101465 | 6/1986 |
| JP | 07-039092 | 2/1995 |
| JP | 08-149741 | 6/1996 |
| JP | 2002-359945 A | 12/2002 |
| JP | 2004-210017 | 7/2004 |
| WO | 2007112871 A2 | 10/2007 |

OTHER PUBLICATIONS

Japanese Office Action dated Aug. 25, 2009.

* cited by examiner

*Primary Examiner*—Dang D Le
(74) *Attorney, Agent, or Firm*—Sughrue Mion, PLLC

(57) ABSTRACT

A motor for an electric power steering apparatus can ensure an appropriate preload to an outer race of a rolling element bearing by adjusting the thickness of a spacer without replacement of a wave washer for a change in an axial dimension between a bottom surface of a bearing box and the bearing. The motor includes a rotor, a casing that receives the rotor and has the bearing box in which the bearing rotatably supporting a shaft of the rotor is received, an annular wave washer that is arranged between the bottom surface of the bearing box and the bearing, and applies a preload to the outer race of the bearing, and an annular spacer that is arranged between the bottom surface of the bearing box and the bearing so as to be in abutment with the wave washer for adjusting the preload applied to the outer race.

12 Claims, 4 Drawing Sheets

MOTOR FOR AN ELECTRIC POWER STEERING APPARATUS

BACKGROUND OF THE INVENTION

1. Field of the Invention

The present invention relates to a motor for an electric power steering apparatus in which a wave washer for applying a preload to a rolling element bearing, which supports a shaft of a rotor for rotation relative thereto, is arranged between the rolling element bearing and a bearing box in which the rolling element bearing is received.

2. Description of the Related Art

As a conventional motor, there has been known one in which a casing with a rotor received therein is formed with a bearing box in which a rolling element bearing for rotatably supporting a shaft of the rotor is received, and a wave washer for applying a preload to an outer race of the rolling element bearing is arranged between a bottom surface of the bearing box and the rolling element bearing (see, for example, a first patent document: Japanese patent application laid-open No. 2002-359945).

In case where such a motor is used with an electric power steering apparatus, it is possible to suppress noise resulting from vibrations of the outer race of the rolling element bearing in the diametrical, circumferential and axial directions thereof by applying a biasing force in the axial direction to the outer race under the action of a resilient force of the wave washer.

In this case, however, when the preload of the wave washer exceeds an appropriate value, a friction between the outer race of the bearing and rolling elements such as balls, rollers, or the like and a friction between the rolling elements and an inner race of the bearing are increased, so a loss torque of the motor accordingly becomes large. Therefore, the rotation following capability of a steering wheel during the steering operation thereof is deteriorated, and the driver comes to feel that the steering wheel is heavy.

Accordingly, in case where the above-mentioned motor is used with the electric power steering apparatus, it is necessary to control the preload of the wave washer in a strict manner in order to satisfy the effect of noise control and to suppress the amount of increase of the loss torque to within an appropriate range.

The preload of the wave washer is decided by the spring constant of the wave washer itself and the compressed height thereof at the time when the wave washer is built into the bearing box, but in case where an axial dimension between the bottom surface of the bearing box and the rolling element bearing changes, the compressed height of the wave washer is varied, so it is necessary to change the spring constant of the wave washer so as to provide an appropriate preload.

Therefore, there has been a problem that it is necessary to provide a new wave washer which is changed in its height or thickness.

SUMMARY OF THE INVENTION

Accordingly, the present invention is intended to obviate the problems as referred to above, and has for its object to obtain a motor for an electric power steering apparatus which is capable of ensuring an appropriate preload to an outer race of a rolling element bearing by adjusting the thickness of a spacer without replacing a wave washer by a new one of different specifications, for example, with respect to a change in an axial dimension between a bottom surface of a bearing box and the bearing.

Bearing the above object in mind, a motor for an electric power steering apparatus according to the present invention includes: a rotor; a casing that receives the rotor therein and has a bearing box in which a rolling element bearing rotatably supporting a shaft of the rotor is received; a wave washer of an annular shape that is arranged between a bottom surface of the bearing box and the rolling element bearing, has a plurality of convex portions and concave portions that alternately undulate in a circumferential direction, and applies a preload to an outer race of the rolling element bearing; and a spacer of an annular shape that is arranged between the bottom surface of the bearing box and the rolling element bearing so as to be in abutment with the wave washer for adjusting the preload applied to the outer race.

According to the motor for an electric power steering apparatus of the present invention, there is achieved an advantageous effect that an appropriate preload to the outer race of the rolling element bearing can be ensured by adjusting the thickness of the spacer without replacing the wave washer by a new one of different specifications, for example, with respect to a change in an axial dimension between the bottom surface of the bearing box and the rolling element bearing.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
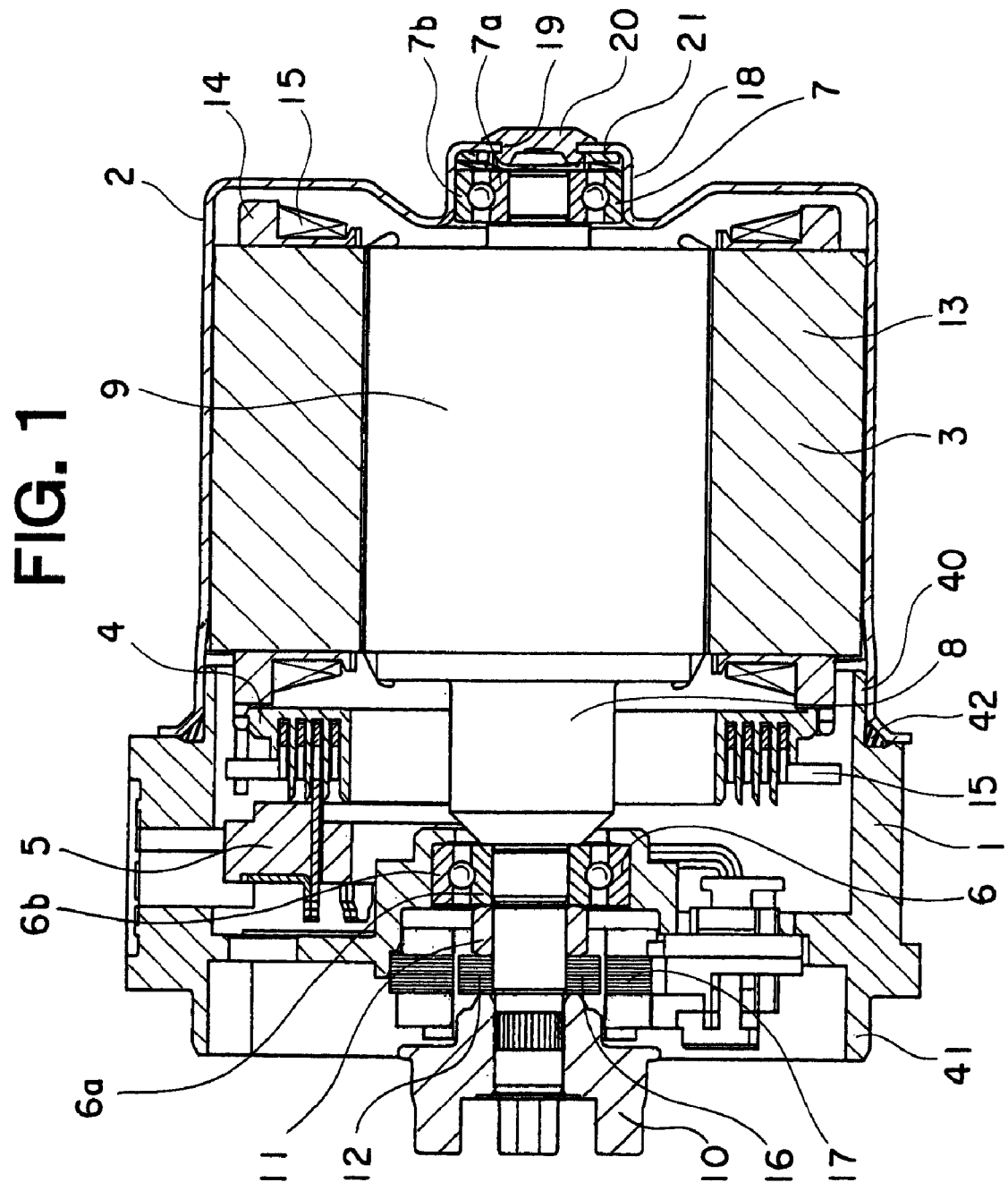
FIG. 1 is a cross sectional side elevational view showing a motor for an electric power steering apparatus according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Figure 2:
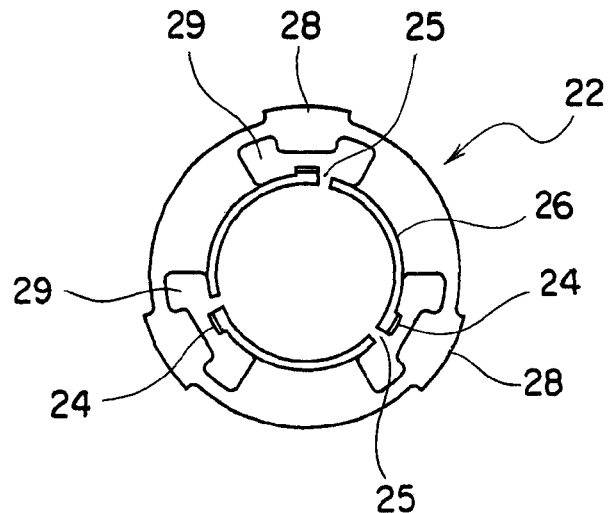
FIG. 2 is a front elevational view of a spacer in FIG. 1.
Figure 3:
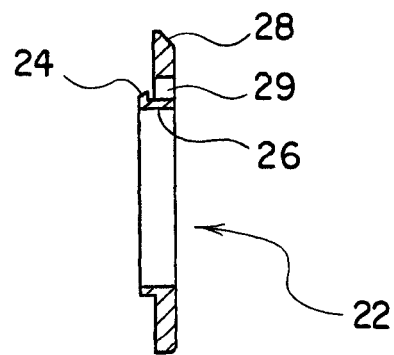
FIG. 3 is a left side cross sectional view of FIG. 2.
Figure 4:
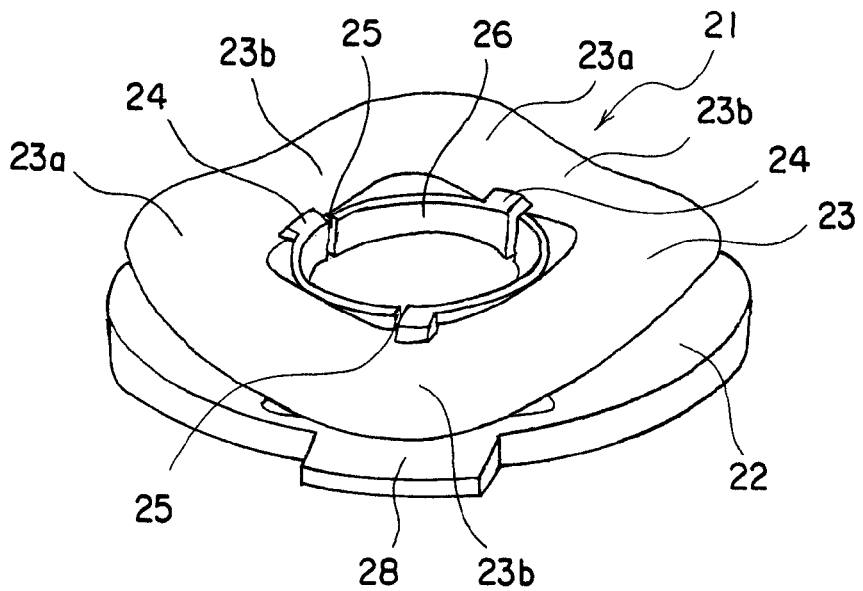
FIG. 4 is a perspective view showing a washer spacer assembly in FIG. 1.

Referring to the accompanying drawings and first to FIG. 1, there is shown a motor for an electric power steering apparatus (hereinafter referred to as a motor) according to a first embodiment of the present invention. FIG. 2 is a front elevational view of a spacer in FIG. 1, and FIG. 3 is a left side cross sectional view of FIG. 2. FIG. 4 is a perspective view showing a washer spacer assembly in FIG. 1.

This motor includes a housing 1 made of a material such as aluminum, a frame 2 in the form of a bottomed cylindrical shape having a peripheral portion fixedly secured to the housing 1 by means of screws (not shown), a stator 3 fixedly attached to an inner wall surface of the frame 2, a holder 4 fixedly attached to one side surface of the stator 3, and a base 5 provided on the holder 4 at a side opposite to the stator 3.

In addition, the motor further includes: a shaft 8 that is disposed on a central axis of the casing, which is composed of the housing 1 and the frame 2, and is rotatably supported by a housing side rolling element bearing 6 (hereinafter abbreviated as a housing side bearing) and a frame side rolling element bearing 7 (hereinafter abbreviated as a frame side bearing); and a rotor 9 that has N pole magnets and S pole magnets bonded to the shaft 8 in an alternate manner with an outer peripheral surface being covered with a protective tubing (not shown); a boss 10 that is press-fitted over an end of the shaft 8 and is connected with a steering mechanism (not shown); and a resolver 12 that is arranged between the boss 10 and a bush 11 press-fitted over the shaft 8, and serves as a rotational position sensor for detecting the rotational angle of the shaft 8.

The housing 1 is formed at its one end with a frame side engagement portion 40 that is in fitting engagement with the frame 2, and at its other end with a gear side engagement portion 41 that is in fitting engagement with a steering gear side housing (not shown).

The frame 2 has an end portion fitted over the frame side engagement portion 40 of the housing 1 through an O ring 42, and is fixedly attached to the housing 1 to form a sealed casing by means of a plurality of screws (not shown) threaded into the peripheral portion of the housing 1.

The stator 3 is provided with a core 13 that is composed of a plurality of laminated silicon steel sheets with a plurality of axially extending slots (not shown) being formed therethrough at appropriate circumferential intervals with respect to one another, and a motor coil 15 that is constructed by winding a conductor around a bobbin 14 in each slot of the core 13. The motor coil 15 has a U-phase coil portion, a V-phase coil portion and a W-phase coil portion connected to one another in a star configuration, and these individual coil portions are connected at their common sides with a common terminal 15 by means of fusing.

The stator 3 is press-fitted into a cup-shaped frame 2 that is formed by drawing an iron plate, and the frame 2 is formed at its bottom surface portion with a bearing box 18 in which the frame side bearing 7 is received and held.

A hole 19, which is used when the housing 1 and the frame 2 are placed in fitting engagement with each other, is formed through the bottom surface portion of the frame 2. A cap 20 made of rubber is attached to the hole 19 for ensuring the waterproofness of the motor.

The resolver 12 is provided with a resolver rotor 16 of an elliptic shape that is press-fitted over the shaft 8, and a resolver stator 17 that is arranged so as to surround the resolver rotor 16.

The housing side bearing 6 has an inner race 6a press-fitted over and fixedly attached to the shaft 8, and an outer race 6b fixedly secured to the housing 1 by means of caulking.

Also, the frame side bearing 7 has an inner race 7a press-fitted over and fixedly attached to the shaft 8, and an outer race 7b fitted into the bearing box 18 by means of a clearance fit.

A spacer washer assembly 21, as shown in FIG. 4, is arranged between a side surface of the frame side bearing 7 and the bottom of the bearing box 18.

Hereinafter, the spacer washer assembly 21 will be explained in detail.

The spacer washer assembly 21 is composed of an annular spacer 22, as shown in FIGS. 2 and 3, and a wave washer 23 that is assembled to the spacer 22 to form an integral unit.

The annular spacer 22 is molded of a resin such as a polybutylene terephthalate (PBT) resin, a nylon resin, etc. The spacer 22 is formed at its inner peripheral edge portion with a wall 26 that extends to the frame side bearing 7 along the edge portion.

The height of the wall 26 is lower than the height of the wave washer 23 after being compressed. In addition, the diametrical movement of the wave washer 23 is restricted by means of the wall 26, so that the wave washer 23 can be located in a position to push the outer race 7b of the frame side bearing 7 in a reliable manner.

The wall 26 is formed at its upper end portion with three snap fit portions 24 that are bent in diametrically outside directions and are arranged at equal intervals in a circumferential direction thereof. The wall 26 also has holes 25 that are formed at one side of each snap fit portion 24 so as to divide the wall 26 into three portions.

The spacer 22 is formed on an outer peripheral portion with three protrusions 28 that protrude in diametrically outer directions on the same diametrical lines, respectively, as those on which the snap fit portions 24 lie. These protrusions 28 serve to constitute a retaining unit that holds the spacer 22 within the bearing box 18, and diametrically enlarged holes 29 are formed between the protrusions 28 and the snap fit portions 24, respectively. When the spacer washer assembly 21 is press-fitted into the bearing box 18, the protrusions 28 and the nearby spacer 22 become easy to be flexibly deformed in a diametrical inner direction due to the holes 29, so it is possible to press-fit the spacer washer assembly 21 into the bearing box 18 by means of a small force.

Here, note that the protrusions 28 are only one example of the retaining unit, and there may be used, as such a retaining unit, a bonding material that bonds the circumferential surface of the spacer and the inner wall surface of the bearing box to each other, or the spacer 22 may be held within the bearing box 18 by means of caulking.

The wave washer 23 is formed of a metal plate, takes a generally annular shape, and has gently convex portions 23a and gently concave portions 23b undulating alternately along the circumferential direction thereof. The concave portions 23b correspond to the snap fit portions 24, respectively. The wave washer 23 has an outer diameter substantially equal to an outer diameter of the spacer 22, and an inner diameter substantially equal to an outer diameter of the wall 26 of the spacer 22.

In order to assemble the wave washer 23 to the spacer 22, the snap fit portions 24 are flexibly deformed inwardly so as to reach up to an inner diameter side of the wave washer 23, and are then pushed, in such a state, into the spacer 22 in a manner so that they are overlapped with the spacer 22. Thereafter, at the instant when the concave portions 23b of the wave washer 23 are placed into abutment with the surface of the spacer 22, the force applied to the diametrically inner sides of the snap fit portions 24 is released. As a result, the snap fit portions 24 are caused, under the action of their own resiliency, to return to their previous states in which no force is applied thereto, and the snap fit portions 24 are placed into engagement with the concave portions 23b of the wave washer 23, whereby the wave washer 23 is assembled to the spacer 22 to form the spacer washer assembly 21.

Here, note that in this assembling operation, the holes 25 are formed at locations adjacent to the snap fit portions 24, so it is possible to cause the snap fit portions 24 to be flexibly deformed by means of a light or small force.

In addition, since the snap fit portions 24 can be flexibly deformed toward the inner diameter side of the wave washer 23 by the light or small force without being subjected to a large force, it is possible to prevent the breakage of the snap fit portions 24.

Next, reference will be made to the procedure of assembling the motor of the above construction.

First of all, the spacer washer assembly 21 is press-fitted into the bearing box 18 of the frame 2. In this case, since the protrusions 28 of the spacer 22 are formed on the same diametrical lines as those on which the snap fit portions 24 lie, the spacer washer assembly 21 can be press-fitted into the bearing box 18 in a smooth and reliable manner by pushing the concave portions 23b of the wave washer 23 to press-fit it into the bearing box 18.

In addition, upon press-fitting of the spacer washer assembly 21, the wave washer 23 is not subjected to compression, so it is possible to prevent the spring force of the wave washer 23 from being reduced.

Thereafter, the stator 3 is press-fitted into the frame 2.

On the other hand, the housing side bearing 6 formed integral with the housing 1, the bush 11, the resolver rotor 16 and the boss 10 are press-fitted over one end of the shaft 8, and the frame side bearing 7 is press-fitted over the other end of the shaft 8.

Thereafter, the shaft 8 thus formed integral with the housing 1 is inserted into the interior of the stator 3 fixedly attached to the holder 4, and the frame side bearing 7 is fitted into the bearing box 18.

At this time, the frame side engagement portion 40 of the housing 1 is fitted into one end portion of the frame 2.

Upon fitting of the frame side bearing 7, the wave washer 23 is pushed between the frame side bearing 7 and the spacer 22 through the outer race 7b of the frame side bearing 7, whereby the inner diameter of the wave washer 23 is caused to expand, thus releasing the engagement thereof with the snap fit portions 24.

Finally, the housing 1 and the frame 2 are coupled with each other to form an integral unit by means of a plurality of screws (not shown) which are threaded through the frame 2 into the peripheral portion of the housing 1.

Here, note that the wave washer 23 may be in a state engaged with the snap fit portions 24.

In addition, in case where in an unassembled state of the frame 2, the spacer washer assembly 21 can not be press-fitted into the bearing box 18 for some reasons such as constraints of a production line layout or the like, the press-fitting of the spacer washer assembly 21 may be performed in any process step after the press-fitting of the stator 3 into the frame 2 and before assembling of the frame 2 to the housing 1.

In the motor for an electric power steering apparatus as constructed above, electric current flows to the motor coil 15 through a power supply line (not shown), so that a rotating field is generated in the motor coil 15. In accordance with the rotating field, the rotor 9 is driven to rotate, and the rotational force of the rotor 9 is transmitted to the steering mechanism through the shaft 8, whereby it is provided to assist the torque of the steering mechanism.

As described in the foregoing, according to the motor of the above construction, provision is made for the spacer 22 in the form of an annular shape that is arranged between the bearing box 18 and the rolling element bearing 7 for adjusting the preload applied to the outer race 7b of the bearing 7. With such an arrangement, by adjusting the thickness of the spacer 22 with respect to, for example, a change in the axial dimension between the bottom surface of the bearing box 18 and the rolling element bearing 7, an appropriate preload can be ensured, thus making it possible to improve the degree of freedom of setting the preload force.

In addition, since the wave washer 23 and the spacer 22 are formed of the spacer washer assembly 21 of an integral structure, the wave washer 23 and the spacer 22 can be handled as a single unit at the time when the motor is assembled, and hence the assembling efficiency can be improved.

Moreover, since the protrusions 28 are formed on the outer peripheral surface of the spacer 22, the spacer washer assembly 21 can be handled together with the frame 2, thus making it possible to improve the assembling efficiency.

Further, the spacer 22 is formed of a resin, and has the snap fit portions 24 adapted to be placed in engagement with the wave washer 23, so the wave washer 23 and the spacer 22 can be integrated with each other in an easy and simple manner.

Furthermore, since the spacer 22 has the holes 25 formed at locations adjacent to the snap fit portions 24, respectively, so as to extend through and along the snap fit portions 24, the snap fit portions 24 can be flexibly deformed by means of a small force, so that the wave washer 23 can be assembled to the spacer 22 in a prescribed position thereof in an easy way.

In addition, the spacer 22, which has the holes 29 formed in the vicinity of the protrusions 28, respectively, so as to extend in the circumferential direction, can be flexibly deformed by means of a small force, whereby the spacer washer assembly 21 can be assembled to the frame 2 in a simple manner.

Here, note that the rigidity of the spacer 22 can be changed simply by changing the size of each hole 29.

Also, the spacer 22 is formed on its inner peripheral edge portion with the wall 26 that restricts the diametrical movement of the wave washer 23, so the spacer 22 and the wave washer 23 can be arranged on the same axis in a simple manner, thus making it possible to transmit the resilient force of the wave washer 23 to the outer race 7b of the rolling element bearing 7 in a reliable manner.

Moreover, since the engagement of the spacer 22 with the wave washer 23 by means of the snap fit portions 24 is released in the bearing box 18, the spacer 22 is free from the influence of the preload force of the wave washer which would otherwise be generated by the engagement of the snap fit portions 24, so a more appropriate preload force can be provided to the outer race 7b.

Further, since the spacer 22 is released from the engagement thereof with the wave washer 23 due to the enlarged inner diameter thereof resulting from the deformation of the wave washer 23, the resilient force of the wave washer 23 is not applied to the snap fit portions 24 of the spacer 22 when the spacer washer assembly 21 is received in the bearing box 18. Accordingly, there will be no fear that the snap fit portions 24 of the spacer 22 might be damaged or broken to generate foreign matter due to the resilient force of the wave washer 23.

In addition, the protrusions 28, which serve as the retaining unit, are arranged on the diametrical lines of the concave portions 23b of the wave washer 23, so when the spacer washer assembly 21 is assembled to the bearing box 18, such assembling can be carried out by pushing the concave portions 23b without causing the convex portions 23a to be elastically deformed, as a consequence of which it is possible to perform the assembly without reducing the resilient force of the wave washer 23.

Embodiment 2

Figure 5:
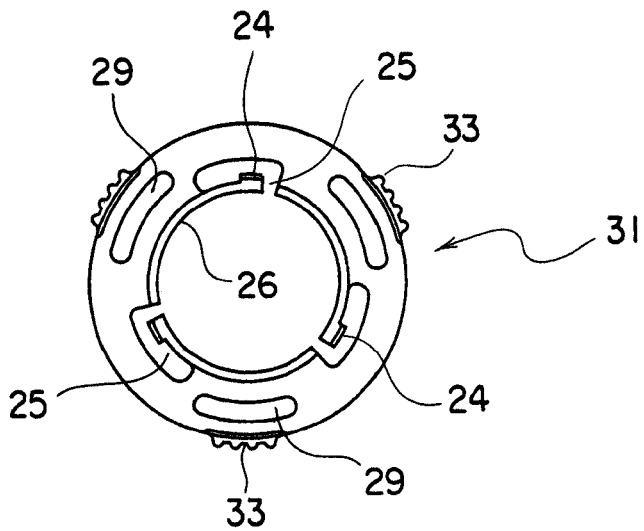
FIG. 5 is a front elevational view showing a spacer in a motor for an electric power steering apparatus according to a second embodiment of the present invention.
Figure 6:
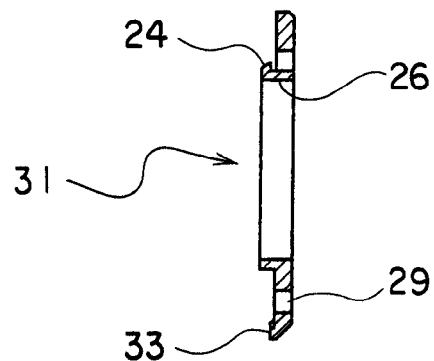
FIG. 6 is a left side cross sectional view of FIG. 5.
Figure 7:
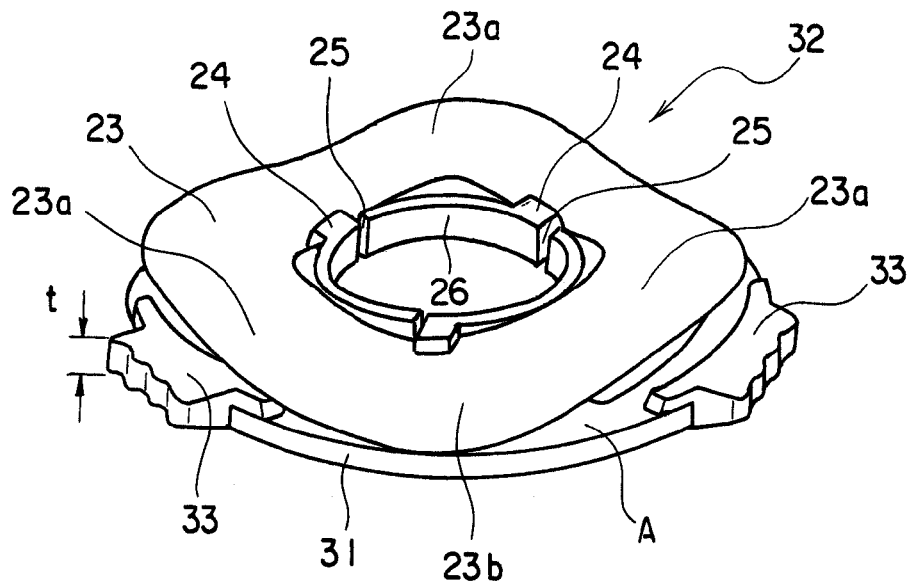
FIG. 7 is a perspective view showing a washer spacer assembly in FIG. 5.

FIG. 5 is a front elevational view that shows a spacer for a motor according to a second embodiment of the present invention. FIG. 6 is a left side cross sectional view of the spacer in FIG. 5, and FIG. 7 is a perspective view that shows a washer spacer assembly in FIG. 5.

In this second embodiment of the present invention, a spacer 31 is formed on an outer peripheral portion with a plurality of (e.g., three in the illustrated example) protrusions 33 that protrude in diametrically outer directions on diametrical lines, respectively, which pass centrally between adjacent individual snap fit portions 24. Each of the protrusions 33 has its outer peripheral side surface formed into a wave-like or corrugated shape. The protrusions 33, which serve as a retaining unit, are arranged in opposition to convex portions 23a, respectively, of a wave washer 23. With such an arrangement, the protrusions 33 can be formed raised from or higher than a surface A of the spacer 31 which receives or contacts concave portions 23b of the wave washer 23.

Here, note that when the wave washer 23 is compressed, the wave washer 23 is set to such dimensions so as not to be in abutment with the protrusions 33.

The construction of this second embodiment other than the above is similar to that of the first embodiment.

According to the motor of this second embodiment, the same effects as those in the first embodiment can be achieved. In addition, since only the protrusions 33 have a thickness t larger than that of the other portions of the spacer 31, the spacer 31 can provide a more stable fastening force at the time when the spacer washer assembly 32 is press-fitted into a bearing box 18.

Moreover, since the outer peripheral surface of each protrusion 33 takes the wave-like or corrugated shape, it is possible to reduce a sliding area or friction between the spacer washer assembly 32 and the bearing box 18 upon press-fitting the spacer washer assembly 32 into the bearing box 18, whereby the spacer washer assembly 32 can be press-fitted into the bearing box 18 with an accordingly reduced force.

Embodiment 3

Figure 8:
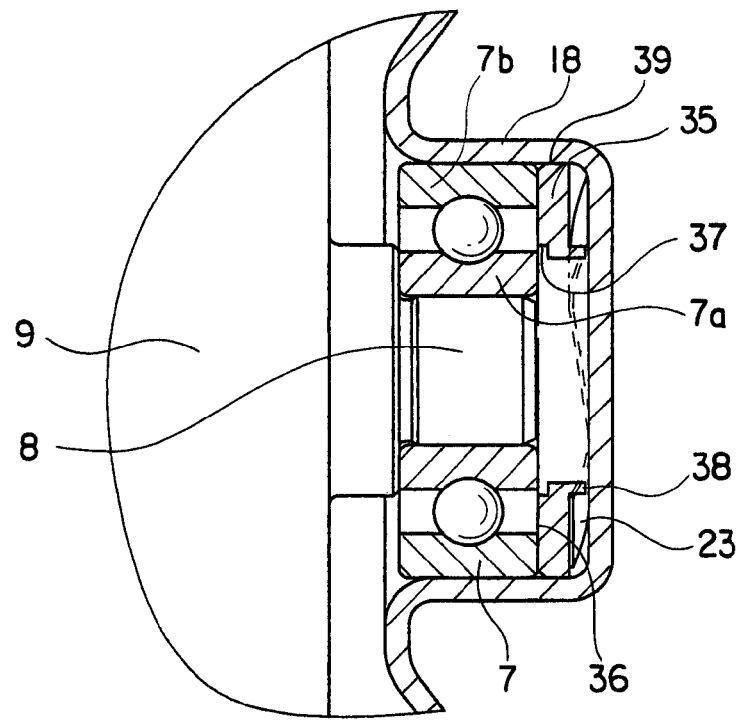
FIG. 8 is a cross sectional side elevational view of essential parts of a motor for an electric power steering apparatus according to a third embodiment of the present invention.
Figure 9:
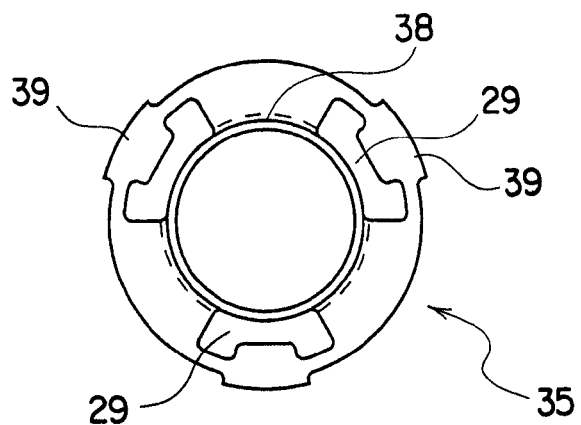
FIG. 9 is a front elevational view showing a spacer in FIG. 8.
Figure 10:
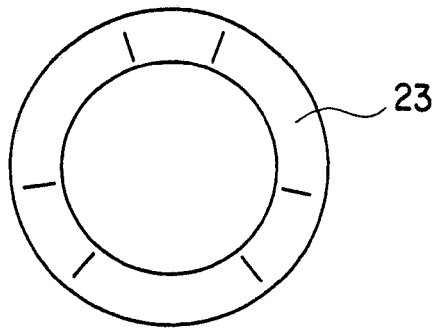
FIG. 10 is a front elevational view showing a wave washer assembly in FIG. 8.

FIG. 8 is a cross sectional side elevational view of essential parts of a motor according to a third embodiment of the present invention. FIG. 9 is a front elevational view that shows a spacer in FIG. 8, and FIG. 10 is a front elevational view that shows a wave washer in FIG. 8.

In this third embodiment of the present invention, a spacer washer assembly 36 is constructed in such a manner that a spacer 35 is in abutment with a frame side bearing 7, and a wave washer 23 is in abutment with a bottom surface of a bearing box 18.

The spacer 35 has a step 37 that is formed over an entire circumference thereof on its inner diameter side and on its peripheral portion near the frame side bearing 7, and the resilient force of the wave washer 23 is transmitted to an outer race 7b of the frame side bearing 7 through the spacer 35.

In addition, the spacer 35 has a wall 38 that is formed over the entire circumference thereof on its inner diameter side and on its peripheral portion remote from the frame side bearing 7. This wall 38 serves to restrict the diametrical movement of the wave washer 23, and the height of the wall 38 is lower than the height of the wave washer 23 after being compressed.

Further, the spacer 35 is formed on its outer peripheral surface with three protrusions 39 that are spaced from one another at equal circumferential intervals and protrude in diametrical directions. A fixing or fastening force of the spacer 35 in the bearing box 18 given by the protrusions 39 is set to be lower than a preload force given by the wave washer 23, so it is possible to reduce or suppress the influence of the fixing or fastening force of the spacer 35 on the preload force of the wave washer 23 to a low level.

The construction of this third embodiment other than the above is similar to that of the first embodiment.

According to the motor of this third embodiment, by adjusting the thickness of the spacer 35 with respect to a change in the axial dimension between the bottom surface of the bearing box 18 and the rolling element bearing 7, an appropriate preload can be ensured, thus making it possible to improve the degree of freedom of setting the preload force, as in the motor of the first embodiment.

In addition, since the protrusions 38 are formed on the outer peripheral surface of the spacer 35, the spacer 35 can be handled integrally with the frame 2, together with the wave washer 23 pushed into the bottom surface of the bearing box 18, and the process of assembling the wave washer 23 and the frame 2 into the bearing box 18 may be carried out in any process step as long as it is done before the frame 2 is assembled to the housing 1.

Here, note that in the motor of this third embodiment, too, snap fit portions 24 may be formed on the spacer 35 to provide an integral structure of the wave washer 23 and the spacer 35, similar to the first and second embodiments.

Although in the motors of the above-mentioned first and second embodiments, the spacer washer assemblies 21, 31, each being of an integral structure, are constructed of the wave washer 23 and the spacers 22, 31, respectively, by using the snap fit portions 24, a wave washer and a spacer may instead be integrally molded of a resin, and a spacer washer assembly may be constructed by connecting the wave washer and the spacer with each other through concave portions of the wave washer.

As other means for integrating a wave washer and a spacer with each other, the spacer may be made of metal such as iron or the like, and concave portions of the wave washer may be caulked by the metal spacer, or the spacer may be made of a magnet, and the wave washer and the spacer may be integrally connected with each other by using a magnetic force of the spacer, or the integral connection between the wave washer and the spacer may be made by using a bonding material.

In addition, in the motors of the above-mentioned first through third embodiments, reference has been made to the rolling element bearing 6 received in the bearing box 18 formed on the frame 2, but in the case of a motor having a bearing box formed on a housing, the present invention can also, of course, be applied to a rolling element bearing received in the bearing box.

Moreover, in the motors of the above-mentioned respective first through third embodiments, the outer race 7b of the rolling element bearing 7 is fitted into the bearing box 18 by means of a clearance fit, so by applying a resilient force from the wave washer 23 to the outer race 7b, it is possible to suppress noise and adjust an increased amount of loss torque within an appropriate range.

In case where the motor has, for example, engagement portions formed on the circumferential surface of the outer race 7b for preventing the circumferential rotation of the outer race 7b but permitting axial movement of the outer race 7b, the following advantageous effects can be obtained. That is, there will be no occurrence of noise due to the circumferential rotation and vibration of the outer race 7b, as well as no occurrence of noise due to the circumferential friction between the outer race 7b and the wave washer 23, thus making it possible to further suppress the occurrence of noise as a whole.

While the invention has been described in terms of preferred embodiments, those skilled in the art will recognize that the invention can be practiced with modifications within the spirit and scope of the appended claims.

What is claimed is:

1. A motor for an electric power steering apparatus, comprising:
   a rotor;
   a casing that receives said rotor therein and has a bearing box in which a rolling element bearing rotatably supporting a shaft of said rotor is received;
   a wave washer of an annular shape that is arranged between a bottom surface of said bearing box and said rolling element bearing, has a plurality of convex portions and concave portions that alternately undulate in a circumferential direction, and applies a preload to an outer race of said rolling element bearing; and
   a spacer of an annular shape that is arranged between said bottom surface of said bearing box and said rolling element bearing so as to be in abutment with said wave washer for adjusting said preload applied to said outer race,
   wherein said convex portions protrude in a direction towards said rotor,.
   wherein said spacer is formed of a resin, and has snap fit portions adapted to engage said wave washer, and
   wherein said snap fit portions engage an inner peripheral edge portion of said concave portions of said wave washer.

2. The motor for an electric power steering apparatus as set forth in claim 1, wherein said spacer is provided with a retaining unit that is held in said bearing box.

3. The motor for an electric power steering apparatus as set forth in claim 2, wherein said retaining unit is arranged on a diametrical line of said concave portions of said wave washer.

4. The motor for an electric power steering apparatus as set forth in claim 2, wherein said retaining unit is arranged on diametrical lines of said convex portions of said wave washer.

5. A motor for an electric power steering apparatus, comprising:
   a rotor;
   a casing that receives said rotor therein and has a bearing box in which a rolling element bearing rotatably supporting a shaft of said rotor is received;
   a wave washer of an annular shape that is arranged between a bottom surface of said bearing box and said rolling element bearing, has a plurality of convex portions and concave portions that alternately undulate in a circumferential direction, and applies a preload to an outer race of said rolling element bearing; and
   a spacer of an annular shape that is arranged between said bottom surface of said bearing box and said rolling element bearing so as to be in abutment with said wave washer for adjusting said preload applied to said outer race,
   wherein said spacer is formed of a resin, and has snap fit portions adapted to engage said wave washer.

6. The motor for an electric power steering apparatus as set forth in claim 5, wherein said spacer has holes formed at locations adjacent to said snap fit portions, respectively, so as to extend through and along said snap fit portions.

7. The motor for an electric power steering apparatus as set forth in claim 5, wherein said spacer is released from its engagement with said wave washer by means of said snap fit portions in said bearing box.

8. The motor for an electric power steering apparatus as set forth in claim 7, wherein said spacer is released from its engagement with said wave washer due to an enlarged inner diameter thereof resulting from deformation of said wave washer.

9. A motor for an electric power steering apparatus, comprising:
   a rotor;
   a casing that receives said rotor therein and has a bearing box in which a rolling element bearing rotatably supporting a shaft of said rotor is received;
   a wave washer of an annular shape that is arranged between a bottom surface of said bearing box and said rolling element bearing, has a plurality of convex portions and concave portions that alternately undulate in a circumferential direction, and applies a preload to an outer race of said rolling element bearing; and
   a spacer of an annular shape that is arranged between said bottom surface of said bearing box and said rolling element bearing so as to be in abutment with said wave washer for adjusting said preload applied to said outer race,
   wherein said spacer is provided with a retaining unit that is held in said bearing box, and
   wherein said spacer is formed of a resin, and said retaining unit comprises protrusions that are formed on the outer peripheral surface of said spacer, and are in pressure contact with an inner wall surface of said bearing box.

10. The motor for an electric power steering apparatus as set forth in claim 9, wherein said wave washer and said spacer are formed of a spacer washer assembly of an integral structure.

11. The motor for an electric power steering apparatus as set forth in claim 9, wherein said spacer has holes formed in the vicinity of said protrusions, respectively, so as to extend in a circumferential direction.

12. The motor for an electric power steering apparatus as set forth in claim 9, wherein said spacer is formed on its inner peripheral edge portion with a wall that restricts the diametrical movement of said wave washer.

* * * * *